3,243,392
COMPOSITIONS OF CELLULOSE ESTERS OF LOWER FATTY ACIDS OR ALKYL ETHERS OF CELLULOSE AND EPOXIDIZED POLYOLEFINS
Robert F. Williams, Jr., and George P. Calloway, Jr., Rochester, N.Y., assignors to Eastman Kodak Company, Rochester, N.Y., a corporation of New Jersey
No Drawing. Filed Mar. 1, 1963, Ser. No. 262,261
14 Claims. (Cl. 260—17)

This invention relates to cellulose ether and ester compositions, and more particularly to cellulose ether and ester compositions having good heat stability and improved physical properties.

Various epoxy compounds have been previously incorporated in cellulose ester compositions. For example, U.S. Patents 2,670,302 and 2,713,845 disclose cellulose ester compositions containing glycidyl ethers and polymeric epoxides resulting from the condensation of an epihalohydrin and a polyhydric phenol as auxiliary stabilizers. Also, epoxy derivatives of vegetable oils and fatty acids have been incorporated in cellulose ester thermoplastic compositions as secondary plasticizers, but without contributing any significant improvement to the over-all physical properties of the composition.

Although it has been recognized that possible advantages would exist in combining polyolefins and cellulose esters, this combination has not been feasible due to the incompatibility of these polymers.

One object of our invention is to provide cellulose ether and ester compositions having good heat stability and improved physical properties. Another object of our invention is to provide heat stabilized cellulose ester compositions which are rigid and moderately tough. A further object of our invention is to provide cellulose ester compositions which are tough and flexible. Still another object of our invention is to provide cellulose ether and ester compositions which are insoluble in common organic solvents. Other objects of our invention will appear herein.

We have found that epoxidized polyethylene may be combined with a cellulose ether, such as ethyl cellulose, or lower fatty acid esters of cellulose, the acyl groups of which contain 2–4 carbon atoms, and which have an average of not more than one free hydroxyl group per anhydro glucose unit, to provide compositions having good heat stability and improved physical properties.

Our invention will be further illustrated by the following examples. Example 1 shows that epoxidized polyethylene may be incorporated in plasticizing concentrations in cellulose ester compositions. These compositions do not discolor due to overstabilization, whereas similar concentrations of epoxy compounds which have been previously disclosed as useful in cellulose ester compositions do show such discoloration at these concentrations.

EXAMPLE 1

A cellulose ester containing 36.5% butyryl, 13.1% acetyl, 2.1% free hydroxyl, 0.0031% combined sulfur and 0.024% ash was neutralized with 0.015 parts $KHC_2O_4$ per 100 parts cellulose ester. The neutralized ester was compounded with 5 parts dibutyl sebacate and 1 part p-tert-butyl phenol per 100 parts cellulose ester. Various epoxy compounds were added to samples of the ester as indicated in the following table and heat stabilities were determined. The results were as follows:

*Table 1*

| | | Stability after ½ hr. at 250° C. | | | | | |
|---|---|---|---|---|---|---|---|
| Parts epoxy/100 parts composition | | 0.25 | | 1.0 | | 5.0 | |
| Epoxy Compound | Epoxide Equivalent | Color | Inherent Viscosity | Color | Inherent Viscosity | Color | Inherent Viscosity |
| 2,2-bis(p-hydroxy-phenyl)propane | 210 | 14 | 1.05 | 22 | 1.08 | 25 | 1.19 |
| Glycerol mono-glycidyl-ether | 165 | 15 | 1.19 | 18 | 1.24 | 200 | 1.23 |
| Dicyclo-diepoxy carboxylate | 140 | 17 | 0.90 | 17 | 1.14 | 45 | 1.19 |
| Tetra-glycidyl ether of tetraphenyl ethane | 220 | 30 | 1.15 | 30 | 1.30 | Black | 1.34 |
| Epoxidized polyethylene (Viscosity of 100 poise at 25° C.) | 145 | 20 | 0.95 | 13 | 1.06 | 11 | (¹) |
| Epoxidized polyethylene (Viscosity of 15 poise at 25° C.) | 232 | 15 | 0.96 | 14 | 1.01 | 10 | (¹) |
| Resorcinol diglycidyl ether | 135 | 20 | 0.91 | 15 | 1.07 | 22 | 1.16 |

¹ Insoluble.

The color values specified in the above table were determined by matching acetone dopes of the heated samples with color standards. Dopes were prepared by tumbling 3 grams of the heated sample in 10 grams of acetone. The color standards range from 400 (dark amber) to 0. The 400 color is that which results when 0.2 gram Ciba oil-soluble yellow BB, 0.2 gram of Calco fast spirit orange R and 0.022 gram of General Dyestuffs Alizarine cyanine green G EX. Conc. is dissolved in 1 liter of dimethyl phthalate. The 0 standard is the original color of the dimethyl phthalate, the values being between 0 and 400 being equally graduated therebetween.

The inherent viscosity indicated in the above table shows the general degree of breakdown. A high viscosity cellulose ester is generally more useful for plastic purposes than one of lower viscosity. Insolubility indicates not only high viscosity, but utility for various applications where the composition might come in contact with organic solvents. Relative viscosity is determined by making a solution (where the composition is soluble) of 0.25 gram of the test composition in 100 ml. of a 9:1 methylene chloride-methyl alcohol mixture. The relative viscosity is the ratio of the flow time of the solution to the flow time for the solvent. The inherent viscosity is then calculated by multiplying the logarithm of the relative viscosity by 9.20.

In the above table it may be seen that at plasticizer concentrations (5 parts epoxy compound to 100 parts cellulose ester) discoloration occurred due to overstabilization with all the epoxy compounds tested except the epoxidized polyethylene.

Example 2 compares a cellulose ester composition plasticized with epoxidized polyethylene and a conventional stabilizer with regard to heat stability of the composition.

EXAMPLE 2

The cellulose acetate butyrate described in Example 1, but having varying amounts of sulfur and ash, as shown in Table 2, were stabilized as follows:

Composition A: Parts
- $KHC_2O_4$ _____ .01
- Strontium naphthenate _____ .01
- p-Tertiary-butyl-phenol _____ .50
- Dibutyl sebacate _____ 5.00
- Cellulose acetate butyrate _____ 100

Composition B: Parts
- $KHC_2O_4$ _____ .01
- p-Tertiary-butyl-phenol _____ .50
- Epoxidized polyethylene resin which was 11.0% epoxy _____ 5.00
- Cellulose acetate butyrate _____ 100

These compositions were tested for heat stability and the results are shown in Table 2.

*Table 2*

| Ester No. | Percent Combined Sulfur | Percent Ash | Composition A | | Composition B | |
|---|---|---|---|---|---|---|
| | | | After ½ hr. at 250° C. | | | |
| | | | Color | Intrinsic Viscosity | Color | Intrinsic Viscosity |
| I | .003 | .005 | 13 | 1.02 | 6 | Insoluble. |
| II | .002 | .004 | 13 | 1.13 | 11 | Do. |
| III | .003 | .006 | 15 | 1.19 | 9 | Do. |
| IV | .003 | .007 | 8 | 1.27 | 9 | Do. |

As may be seen from the foregoing table, the cellulose ester containing a plasticizing amount of epoxidized polyethylene had superior color and intrinsic viscosity to that achieved by the conventional stabilizer. The physical properties of the two compositions were tested by injection molding parts from compositions A and B (Ester No. I) and the physical properties were tested with the results shown in Table 3.

*Table 3*

| | Composition A | Composition B |
|---|---|---|
| Molding temp., °F | 400 | 400 |
| Molding pressure, p.s.i. | 400 | 400 |
| Molding cycle, seconds | 30 | 30 |
| [1] Unnotched impact strength (bar ½" x ¼" x 4") | (3) | (4) |
| Flexural strength, p.s.i. | 5,500 | 7,800 |
| [2] Heat distortion (no load), °C. | 83 | 110 |

[1] In this test, 10 bars were molded from each composition and struck with blows of increasing force up to 16⅔ ft. lb. per in. of face. The percentage of the bars which did not break at the maximum force is noted, and the percentage of breaks with the average force required for breakage is given.
[2] Visible sag noticed when supported on blocks 4 inches apart in oven and the temperature of the oven is increased from room temperature at the rate of 3° F. per minute.
[3] 40% No Breaks; 60% Breaks Averaging 9.3 ft. lb./in. of face.
[4] 100% No Breaks.

Compositions of epoxidized polyethylene and lower fatty acid esters of cellulose which have been hydrolyzed, but which contain an average of no more than one free hydroxyl group per anhydro glucose unit and epoxidized polyethylene may be rendered insoluble by heating, as shown in Table 4. In this instance, 100 parts of the cellulose acetate butyrate described in Example, 1, 5 parts dibutyl sebacate, 0.05 parts p-tert-butyl phenol, 0.012 part potassium acid oxalate and 5 parts of the epoxy compound indicated in the table were mixed together and the resulting compositions were tested for solubility after heating at various temperatures with the following results:

*Table 4*

| [1] Epoxy Compound | Solubility in acetone after— | | |
|---|---|---|---|
| | 1 hr. at 180° C. | 1 hr. at 205° C. | ½ hr. at 250° C. |
| 2,2-bis(p-hydroxy-phenyl)propane | Soluble | Soluble | Soluble. |
| Glycerol mono-glycidyl-ether | do | do | Do. |
| Dicyclo-diepoxy-carboxylate | do | do | Do. |
| Tetra-glycidyl ether of tetraphenyl ether | do | do | Do. |
| Epoxidized polyolefin | do | do | Insoluble. |

[1] Five parts of the epoxy compounds were dispersed in cellulosic thermoplastic consisting of 100 parts cellulose acetate butyrate ester, 5 parts dibutyl sebacate, 0.5 parts p-tertiarybutyl-phenol and 0.12 parts potassium acid oxalate.

It may be seen that the only composition which was rendered insoluble contained the epoxidized polyethylene whereas other epoxy compounds when substituted for the epoxidized polyethylene failed to produce insolubility.

Example III shows that useful compositions may be formulated in accordance with the invention comprising ethyl cellulose and an epoxidized polyethylene.

EXAMPLE III 15.8 grams of ethyl cellulose (average of .8 free hydroxyl group per anhydro glucose unit) was roll compounded with 10 grams of epoxidized polyethylene having an epoxy equivalent of 177 and a viscosity at 25° C. of 1800 poises. This composition, and the ethyl cellulose alone and the epoxidized polyethylene alone, were heated and then tested for solubility by attempting to dope 3 grams of composition with 10 ml. of a 9:1 methylene chloride-methyl alcohol solution. The following results were obtained:

| | ½ hour at 250° C. | ½ hour at 205° C. | One hour at 180° C. |
|---|---|---|---|
| Ethyl cellulose | Soluble | Soluble | Soluble. |
| Epoxidized polyethylene | do | do | Do. |
| Ethyl cellulose-epoxidized polyethylene composition | Insoluble | Insoluble | Do. |

The inherent viscosity (using the procedure employed in Example I) of the ethyl cellulose and the composition of ethyl cellulose and epoxidized polyethylene were compared after heating for 1 hour at 180° C. The ethyl cellulose had a viscosity of 0.79 whereas the combination of ethyl cellulose and epoxidized polyethylene was 1.22. Hence, it may be seen that a considerable superiority in heat stability is achieved with the ethyl cellulose-epoxidized polyethylene composition.

Optimum heat stabilities of the cellulose ester compositions of our invention are realized when the cellulose ester is 3-way stabilized as described in U.S. Patent 2,713,546 and using an epoxidized polyethylene. The epoxidized polyolefin acts as an auxiliary stabilizer in these compositions, although the addition of a neutralizing salt such as potassium acid oxalate and an antioxidant such as p-tert-butyl phenol is beneficial. However, considerable improvement is achieved by adding the epoxidized polyethylene alone to the cellulose ester compositions.

The epoxidized polyethylenes which we incorporate in the cellulose ether and ester compositions of our invention are those which have an epoxy equivalent (number of grams of resin containing one gram mole of epoxide) of 50–1,000 and a molecular weight such that the resins yield a viscosity in acetone at 25° C. of 10–5,400 centipoises. Highly useful results are achieved with epoxidized polyethylene having an epoxy equivalent of about 140 to 240, and a viscosity of 15 to 2,000 centipoises.

Useful compositions may be obtained by incorporating compatible amounts of epoxidized polyethylene with ethyl cellulose or the lower fatty acid esters of cellulose. The cellulose ester should contain an average of not more than one free hydroxyl group per anhydro glucose unit. The cellulose esters may be substantially fully esterified. When the cellulose esters are substantially fully esterified, the epoxidized polyethylene acts as a plasticizer, and is compatible in higher percentages than when the cellulose ester is hydrolyzed. When the cellulose ester has been hydrolyzed to contain about 2% free hydroxyl, the epoxidized polyethylenes useful in this invention are compatible, in the case of cellulose acetate, in amounts up to about 5 parts per 100 parts cellulose acetate; up to about 10 parts epoxidized polyethylene per 100 parts cellulose actate propionate, and up to about 50 parts epoxidized polyethylene per 100 parts cellulose acetate butyrate. When the ester is substantially fully esterified, the epoxidized polyethylene is compatible in amounts up to about 10 parts per 100 parts of cellulose acetate, up to about 50 parts per 100 parts cellulose acetate propionate and up to about 75 parts per 100 parts cellulose acetate butyrate.

Relatively low concentrations of epoxidized polythylene in cellulose ester compositions produce heat-stable, rigid articles having moderate toughness. In high concentrations, the epoxidized polyethylene results in a tough, flexible and heat-stable composition. Insolubility in organic solvents may be achieved when an epoxidized polyethylene is incorporated in a hydrolyzed cellulos ester containing an average of not more than one free hydroxyl group per anhydro glucose unit, and the ratio of epoxy oxygen to free hydroxyl is .25–4 to 1, and preferably is about 1 to 1. The application of heat to such compositions results in articles which are insoluble in the common organic solvents.

Various addenda, including plasticizers, pigments, dyes, filters and inert ingredients may be incorporated in the compositions of the invention.

The compositions of the invention may be fabricated into useful articles by the application of heat and pressure thereto, or by molding, such as injection or vacuum molding, or the compositions may be extruded into useful articles. In addition, the composition may be solvent cast with a solvent system such as benzene and isopropyl alcohol, methyl alcohol and methylene chloride, or acetone, benzene and ispropyl alcohol.

The invention has been described in detail with particular reference to preferred embodiments thereof but it will be understood that variations and modifications can be effected within the spirit and scope of the invention as described hereinabove and as defined in the appended claims.

We claim:

1. A composition of matter comprising a cellulose derivative selected from the group consisting of the lower fatty acid esters of cellulose and ethyl cellulose, which cellulose derivative contains an average of less than about one free hydroxyl group per anhydro glucose unit, and a compatible amount of epoxidized polyethylene.

2. A composition of matter comprising a cellulose derivative selected from the group consisting of the lower fatty acid esters of cellulose and ethyl cellulose, which cellulose derivative contains substantially no free hydroxyl groups, and a compatible amount of epoxidized polyethylene.

3. A composition of matter comprising a substantially fully esterified lower fatty acid ester of cellulose, the acyl groups of which contain 2–4 carbon atoms, and a compatible amount of an epoxidizd polyethylene having an epoxy equivalent of 50–1,000 and a viscosity in acetone at 25° C. of 10–5,400 cps.

4. Claim 3 wherein the epoxidized polyethylene has an epoxy equivalent of 140–240 and a viscosity in acetone at 25° C. of 15–2,000 cps.

5. A composition of matter insoluble in common organic solvents, comprising a hydrolyzed cellulose derivative selected from the group consisting of ethyl cellulose and the lower fatty acid esters of cellulose, the acyl groups of which contain 2–4 carbon atoms, and which cellulose derivative contains an average of not more than about one free hydroxyl group per anhydro glucose unit, and an epoxidized polyethylene having an epoxy equivalent of 50–1,000 and a viscosity in acetone at 25° C. of 10–5,400 cps., the ratio of epoxidized polyethylene to cellulose derivative in said composition being such that the ratio of epoxy oxygen of the epoxidized polyethylene is from about .25–4 per each free hydroxyl group in the cellulose derivative.

6. Claim 5 wherein the ratio of epoxidized polyethylene to cellulose derivative in the composition is such that the ratio of epoxy oxygen in the epoxidized polyethylene per each free hydroxyl group in the cellulose derivative is about 1:1.

7. A composition of matter insoluble in common organic solvents comprising ethyl cellulose having an average of not more than one free hydroxyl group per anhydro glucose unit and an epoxidized polyethylene having an epoxy equivalent of 50–1,000 and a viscosity in acetone at 25° C. of 10–5,400 cps., the ratio of epoxidized polyethylene to ethyl cellulose in said composition being such that the ratio of epoxy oxygen in the epoxidized polyethylene to free hydroxyl in the ethyl cellulose is about 1:1.

8. A method of preparing a composition of matter insoluble in common organic solvents which comprises mixing a lower fatty acid ester of cellulose, the acyl groups of which contains 2–4 carbon atoms and which cellulose ester contains an average of not more than one free hydroxyl group per anhydro glucose unit, with an epoxidized polyethylene having an epoxy equivalent of 50–1,000 and a viscosity in acetone at 25° C. of 10–5,400 cps. to form a composition in which the proportion of epoxidized polyethylene to cellulose ester is such that the ratio of epoxy oxygen in the epoxidized polyethylene is about .25–4 per each free hydroxyl group in the cellulose ester, and heating said composition.

9. A method of preparing a composition of matter insoluble in common organic solvents which comprises mixing ethyl cellulose, containing an average of not more than one free hydroxyl group per anhydro glucose unit, with an epoxidized polyethylene having an epoxy equivalent of 50–1,000 and a viscosity in acetone at 25° C. of 10–5,400 cps. to form a composition in which the proportion of epoxidized polyethylene to ethyl cellulose is such that the ratio of epoxy oxygen in the epoxidized ethylene is about .25–4 per each free hydroxyl group in the ethyl cellulose, and heating said composition.

10. A composition of matter having good heat stability comprising a lower fatty acid ester of cellulose containing an average of not more than one free hydroxyl group per anhydro glucose unit, a neutralizing salt, antioxidant and an epoxidized polyethylene having an epoxy equivalent of 50–1,000 and a viscosity in acetone at 25° C. of 10–5,400 cps.

11. Claim 10 wherein the salt is potassium acid oxalate and the antioxidant is p-tert-butyl-phenol.

12. A composition of matter essentially consisting of 100 parts by weight cellulsoe acetate butyrate containing about 36.5% butyryl, 13.1% acetyl and 2.1% free hydroxyl, 0.015 part potassium acid oxalate, 5 parts dibutyl sebacate, 1 part p-tert-butyl phenol and 5 parts of an epoxidized polyethylene having an epoxy equivalent of about 140–2400 and a viscosity in acetone at 25° C. of 15–2,000 cps.

13. A composition of matter essentially consisting of ethyl cellulose having an average of about one free hydroxyl per anhydro glucose unit together with an epoxidized polyethylene having an epoxy equivalent of about 140–240 and a viscosity in acetone at 25° C. of 15–2,000 cps., the ratio of epoxidized polyethylene to ethyl cellulose in said composition being such that the ratio of epoxy oxygen in the epoxidized polyethylene to each free hydroxyl group of ethyl cellulose is about 1:1.

14. A composition of matter comprising a cellulose derivative selected from the group consisting of the lower fatty acid esters of cellulose and ethyl cellulose, which cellulose derivatives contains an average of less than one free hydroxyl group per anhydro glucose unit, and a compatible amount of an epoxidized polyethylene having an epoxy equivalent of 50–1,000 and a viscosity in acetone at 25° C. of 10–5,400 cps.

References Cited by the Examiner

UNITED STATES PATENTS 2,842,452   7/1958   Koenscke et al. _____ 260—17

WILLIAM H. SHORT, *Primary Examiner.*

J. NORRIS, *Assistant Examiner.*